United States Patent [19]

Shirahata et al.

[11] Patent Number: 4,503,119
[45] Date of Patent: Mar. 5, 1985

[54] MAGNETIC RECORDING MEDIA

[75] Inventors: Ryuji Shirahata; Yasuyuki Yamada; Tatsuji Kitamoto; Goro Akashi, all of Kanagawa, Japan

[73] Assignee: Fuji Photo Film Co., Ltd., Kanagawa, Japan

[21] Appl. No.: 325,939

[22] Filed: Nov. 30, 1981

Related U.S. Application Data

[63] Continuation of Ser. No. 161,535, Jun. 20, 1980, abandoned.

[30] Foreign Application Priority Data

Jun. 20, 1979 [JP] Japan .................................. 54-77692

[51] Int. Cl.$^3$ ............................ H01F 1/06; H01F 1/33
[52] U.S. Cl. ..................................... 428/336; 427/132; 428/341; 428/900; 360/134
[58] Field of Search .................. 427/128, 132; 428/67, 428/900, 333, 336, 341; 360/134; 365/171

[56] References Cited

U.S. PATENT DOCUMENTS

| | | | |
|---|---|---|---|
| 3,342,632 | 9/1967 | Bate et al. | 427/55 X |
| 3,342,633 | 9/1967 | Bate et al. | 427/131 X |
| 3,522,090 | 7/1970 | Nacci | 428/900 X |
| 4,087,582 | 5/1978 | Shirahata et al. | 427/132 X |
| 4,171,399 | 10/1979 | Allen et al. | 427/131 X |
| 4,239,835 | 12/1980 | Iijima et al. | 427/132 X |
| 4,305,993 | 12/1981 | Zaitsu et al. | 427/132 X |

OTHER PUBLICATIONS

Friedman, H. et al, Lubricants for Magnetic Recording Media, IBM Technical Disclosure Bulletin, vol. 9, No. 7, Dec. 1966.

Okamoto, Kunito et al, Dependence of Columnar Structure on Film Thickness in Iron Film Evaporated at Oblique Incidence, vol. 40, No. 1, Jan. 1976, pp. 293-294.

Primary Examiner—Michael R. Lusignan
Attorney, Agent, or Firm—Sughrue, Mion, Zinn, Macpeak and Seas

[57] ABSTRACT

A magnetic recording medium which is characterized by a lubricant present in channels diagonally extending through a magnetic metal thin film having a columnar structure formed by vapor deposition; this medium possesses improved running properties and abrasion resistance which last for an extended period of time.

11 Claims, 1 Drawing Figure

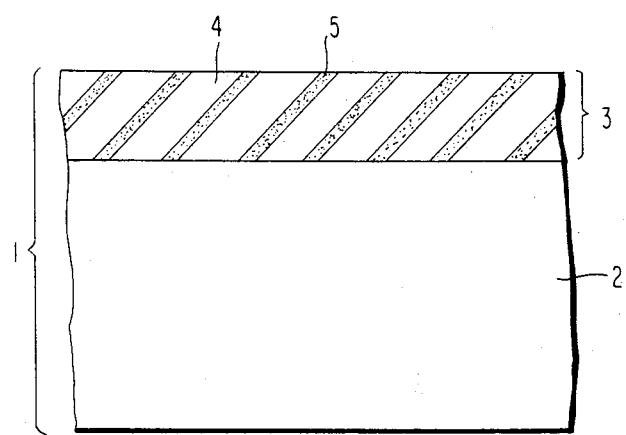

MAGNETIC RECORDING MEDIA

This is a continuation of application Ser. No. 161,535, filed June 20, 1980, now abandoned.

BACKGROUND OF THE INVENTION

1. Field of the Invention

The present invention relates to magnetic recording media comprising magnetic thin films obtained by vapor deposition as magnetic recording layers. More particularly, this invention relates to vapor deposition type magnetic recording media having excellent running properties and abrasion resistance.

2. Description of the Prior Art

There have heretofore been widely employed as magnetic recording media obtained by dispersing powder magnetic materials such as oxide magnetic powders, ferromagnetic alloy powders and the like, e.g. $\gamma$-$Fe_2O_3$, $\gamma$-$Fe_2O_3$ doped with Co, $Fe_3O_4$, $Fe_3O_4$ doped with Co, Berthollide compounds of $\gamma$-$Fe_2O_3$ and $Fe_3O_4$, $CrO_2$, etc., in an organic binder such as a vinyl chloride-vinyl acetate copolymer, styrene-butadiene copolymer, epoxy resin, polyurethane resin or the like, coating the dispersion on a non-magnetic support and drying. Lately with the increased demand for high density recording, attention has been directed to the so-called metal thin film type magnetic recording media which are binderless and utilize as the magnetic recording layers ferromagnetic metal thin films formed by a vapor deposition technique such as vacuum deposition, sputtering, ion plating, etc., or a plating method such as electro plating, electroless plating etc., and a great deal of effort has been exerted toward the practical applications.

Since the former coated magnetic recording media primarily employ metal oxides having low saturation magnetization as magnetic materials, the reduction in thickness which is required for high density recording has reached its limit because it results in a reduction in signal output. Another drawback to coated media is that the production process is complicated and requires large auxiliary equipment for solvent recovery or preventing pollution. The magnetic recording media of the metal thin film type have the advantage that they can be formed as extremely thin films of ferromagnetic metals having greater saturation magnetization than the oxides in the state free from non-magnetic materials such as binders. Of the magnetic recording media of the metal thin film type, the vapor deposition type magnetic recording media which form films from the gaseous state are advantageous in that the film forming speed is rapid, the production process is simple, and the disposal of waste liquor is not necessary. However, important problems are raised with the vapor deposition type thin film magnetic recording media with respect to resistance to corrosion, impact and abrasion. In other words, in the process of recording, play back and erasing of magnetic signals, the relative movement with the magnetic head makes abrasion or damage due to contact with the magnetic head likely. The vapor deposition type magnetic recording media have heretofore suffered from wear due to the damage on contact sliding with magnetic heads. While attempts have been made to reduce wear by overcoating a polymer film of approximately 0.2 microns in thickness, due to spacing loss this reduces the output. It has also been known to coat a lubricant to reduce the friction between the magnetic head and the metal thin film and thus reduce the abrasion, but the effect imparted by coating the lubricant does not last long and upon use of the magnetic tape increased abrasion and damage of the magnetic tape can suddenly occur.

SUMMARY OF THE INVENTION

One object of the present invention is to provide vapor deposition type magnetic recording media having excellent running properties and abrasion resistance.

A further object of the present invention is to provide vapor deposition type magnetic recording media with a prolonged improvement in running properties and abrasion resistance.

As a result of intensive study on metal thin film magnetic recording media, it has now been found that by forming a vapor deposition magnetic film having a columnar structure and filling diagonally directed channels between the columnar structure with a lubricant, running properties and abrasion resistance are greatly improved and at the same time this improvement lasts for an extended time. Accordingly, the present invention resides in a magnetic recording medium which is characterized by a lubricant present in diagonally extending channels in a magnetic metal thin film having a columnar structure formed by vapor deposition.

BRIEF DESCRIPTION OF THE DRAWING

The FIGURE is a schematic illustration of an embodiment of a magnetic media in accordance with the present invention.

DETAILED DESCRIPTION OF THE INVENTION

Referring to the FIGURE a magnetic recording medium 1 is composed of a non-magnetic base 2 and a magnetic metal thin film layer 3 formed by vapor deposition thereon. The magnetic metal thin film layer 3 is formed of a columnar structure 4 and channels therebetween filled with a lubricant 5. The term "fill" as used herein implies that the lubricant partially or entirely fills the space existing in the channels and therefore includes adsorption of the lubricant by the wall of the channel.

In the present specification, vapor deposition includes any method of depositing metal or its alloy or compound as a vapor or an ionized vapor onto a base in a gaseous atmosphere or vacuum, and includes vacuum deposition, sputtering, ion plating, chemical vapor deposition, etc.

Among the vapor deposition techniques useful in preparing a magnetic recording media in the present invention, the conditions vary considerably depending on the methods and materials used, but the chief differences therebetween are roughly summarized in Table 1.

TABLE 1

| | Method | | | | |
|---|---|---|---|---|---|
| Conditions | Vacuum Deposition | Sputtering | Ion Plating | Ion Beam Deposition | Chemical Vapor Deposition |
| Pressure of | $\lesssim 10^{-5}$ | $10^{-2}$ to $10^{-3}$ | $10^{-2}$ to $10^{-3}$ | $10^{-5}$ to $10^{-6}$ | <1 atm |

TABLE 1-continued

| Conditions | Method | | | | |
|---|---|---|---|---|---|
| | Vacuum Deposition | Sputtering | Ion Plating | Ion Beam Deposition | Chemical Vapor Deposition |
| Atmosphere (Torr) | | (Ar) | (Ar) | | (Ar) |
| Temperature of Material | Evaporation temperature | Water cooling | Evaporation temperature | — | >Evaporation temperature |
| Film Thickness | several $\mu$ | several $10\mu$ | several $10\mu$ | several $\mu$ | several $100\mu$ |
| Deposition Rate (Å/sec) | several 100 | several 100 | several 100 | several 10 to 3000 | $10^2$ |
| Applied Voltage | — | several V to several 100 V | several 10 V to 10 KV (glow discharge) | ~500 V | — |

Furthermore, the ferromagnetic metal layer formed as a magnetic recording layer in the present invention is that formed into a thin film by vapor deposition of a ferromagnetic metal such as iron, cobalt, nickel etc., or ferromagnetic alloys such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, Co-Sm-Cu etc., and the thickness of the layer, when used as a magnetic recording medium, is about 0.05 to $2\mu$, preferably about 0.1 to $0.4\mu$.

The film forming methods using these vapor deposition techniques are described in, for example, L. Holland, *Vacuum Deposition of Thin Films*, Chapman & Hall Ltd., 1956; L. I. Maissel & R. Glang, *Handbook of Thin Film Technology*, McGraw-Hill Co., 1970; U.S. Pat. Nos. 2,671,034; 3,329,601; 3,342,632; 3,342,633; 3,516,860; 3,615,911; 3,625,849; 3,700,500; 3,772,174; 3,775,179; 3,787,237; 3,856,579, etc.

An especially preferred method of making a magnetic metal thin film layer having a columnar structure and at the same time having diagonal channels for a lubricant is an oblique incidence evaporation method as described in U.S. Pat. Nos. 3,342,632 and 3,342,633. The oblique incidence evaporation method is a method of forming a magnetic metal thin film by having an evaporated beam of a ferromagnetic metal impinge the surface of a base on the diagonal. The magnetic metal thin film obtained by this method not only has diagonally extending channels but also magnetic properties desirable in a high density magnetic recording medium. The incident angle of the vapor beam on deposition (i.e., the angle between a perpendicular to the surface of the base and the incident vapor beam) is up to 90° and preferably from 50° to 85°, and there is thus formed a film having a columnar structure the longitudinal axis of which is at an angle to the surface of base 2 as shown in the FIGURE. The angle between the longitudinal axis and a line perpendicular to the film face is generally smaller than the incident angle of the evaporated beam, and the percent volume of the channel in the metal thin film layer 3 (based on the total volume of the metal layer) can vary from about 10 to 60% when the incident angle of the evaporated beam is 50° or more.

The lubricant used in the present invention includes fatty acids having 12 to 18 carbon atoms (i.e., $R_1$COOH wherein $R_1$ is an alkyl or alkenyl group of 11 to 17 carbon atoms, such as caprylic acid, capric acid, lauric acid, myristic acid, palmitic acid, stearic acid, oleic acid, elaidic acid, linoleic acid, linolenic acid, stearolic acid etc.); fluorine containing compounds of the aforementioned fatty acid esters; amides of the aforementioned fatty acids; polyalkylene oxide alkylphosphoric acid esters; silicone oils such as dialkylpolysiloxanes (the alkyl group containing 1 to 5 carbon atoms), dialkoxypolysiloxanes (the alkoxy group containing 1 to 4 carbon atoms), monoalkylmonoalkoxypolysiloxanes (the alkyl group containing 1 to 5 carbon atoms and the alkoxy group containing 1 to 4 carbon atoms), phenylpolysiloxane, fluoroalkylpolysiloxanes (the alkyl group containing 1 to 5 carbon atoms) etc.; fatty acid esters of a monobasic fatty acid containing 12 to 20 carbon atoms and a monohydric alcohol containing 3 to 12 carbon atoms etc. In addition, higher alcohols having saturated fatty acid residues containing 12 to 22 carbon atoms as well as sulfuric acid esters, quaternary ammonium salts etc. may be employed. Some of the above lubricants are described in Japanese Patent Application (OPI) Nos. 114205/1975 (U.S. Pat. No. 3,993,824), 136009/1975, 70811/1977, 108804/1977, 19004/1978, 24806/1978, 42706/1978, 42707/1978, 11703/1979, 14711/1979, 21806/1979 etc.

In order to fill the channels with lubricant, the magnetic metal thin film may be coated with the lubricant dissolved in an organic solvent and dried, and preferably, ultrasonic radiation is applied to the magnetic metal thin film in order to accelerate the permeation of the lubricant throughout the channels. Alternatively, it is also effective to melt the lubricant to the channels by using heating rolls or irradiating with infrared light after coating and drying. Further as a method of filling the lubricant, it is also possible to direct an evaporated beam of the lubricant against the magnetic metal thin film at a direction parallel the longitudinal axis of the columnar structure to effect the deposition. If more lubricant than necessary to fill the channels of the magnetic metal thin film having the columnar structure forms a thick lubricant layer on the thin film, it is preferred to wipe it off with an organic solvent otherwise it causes spacing loss. The amount of lubricant incorporated in the magnetic metal thin film is generally in the range of about 2 to 200 mg/m², preferably about 5 to 100 mg/m².

The organic solvent used as a coating solvent for the lubricant may be selected from ketones such as acetone, methyl ethyl ketone, methyl isobutyl ketone, cyclohexanone etc.; alcohols containing 1 to 10 carbon atoms such as methanol, ethanol, propanol, butanol etc.; esters such as methyl acetate, ethyl acetate, butyl acetate, ethyl lactate, glycol acetate monoethyl ether; glycol ethers such as ether, glycol dimethyl ether, glycol monoethyl ether, dioxane etc.; hydrocarbons such as pentane, hexane, heptane, octane, nonane, decane etc.; tars (aromatic hydrocarbons) such as benzene, toluene, xylenes etc.; chlorinated hydrocarbons such as methylene chloride, ethylene chloride, carbon tetrachloride, chloroform, ethylene chlorohydrin, dichlorobenzene etc.

In combination with the lubricant, an anticorrosive agent as described in Japanese Application (OPI) Nos. 63495/1976 and 41204/1978 or a mildew-proofing agent as described in Japanese Patent Aplication No. 26880/1979 or the like may be filled in the channels as needed.

The present invention will be more particularly described by the following examples which are not intended as limiting the present invention.

EXAMPLE 1

A polyethylene terephthalate film $20\mu$ in thickness was diagonally deposited with a cobalt magnetic film (film thickness of $0.2\mu$) to prepare a magnetic tape. The evaporating source used was an electron beam charged with 99.95% pure cobalt and oblique incidence evaporation was conducted in a vacuum of $5 \times 10^{-5}$ Torr and at an incident angle of 70°. Observation by SEM (scanning electron microscope) revealed that the angle of the longitudinal axis of the columnar structure with a perpendicular to the film face was 50° and the percent volume of the channels was 20%. The magnetic tape thus obtained was coated at a rate of 50 mg/m$^2$ with a lubricant solution obtained by dissolving n-butyl stearate ($C_{17}H_{35}COOC_4H_9$) in n-hexane, at a concentration of 0.5% by weight and dried, thereby filling the channels with the lubricant. The sample which had been filled with the lubricant was designated No. 11 and that not filled with lubricant was designated No. 12.

EXAMPLE 2

A polyamide film $12\mu$ in thickness was diagonally deposited with Co-Ni alloy (30% by weight of Ni) at an incident angle of 65° under the conditions used in Example 1 to form a magnetic thin film having a columnar structure (film thickness of $0.3\mu$), thereby obtaining a magnetic tape. The volume of the channels was filled with a silicone oil of the formula

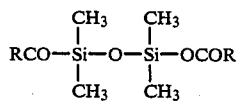

wherein R is $C_{13}H_{27}$ dissolved in benzene at a concentration of 0.3% by weight. The solution was coated on the film at a rate of 20 mg/m$^2$ while applying ultrasonic waves thereto. In this example, the sample which had been filled with the lubricant in the channels was designated No. 21 and that not filled with lubricant was designated No. 22.

EXAMPLE 3

A polyethylene terephthalate film $12\mu$ in thickness was diagonally deposited with Fe-V alloy (5% by weight of V) at an incident angle of 75° under the conditions in Example 1 to form a magnetic metal thin film having a columnar structure (film thickness of $0.25\mu$), thereby obtaining a magnetic tape. The angle of the longitudinal axis of the columnar structure to a line perpendicular to the film face was 62° and the percent volume of channels was 35%. The thus obtained magnetic tape was coated with a solution of a lubricant obtained by dissolving n-octadecaneamide ($C_{17}H_{35}CONH_2$) in ethyl acetate at a concentration of 0.1% by weight in 75 mg/m$^2$ while applying ultrasonic waves thereto, thus filling the channels with the lubricant. In this example, the sample filled with the lubricant was designated No. 31 and that not filled with lubricant was designated No. 32.

EXAMPLE 4

A polyethylene terephthalate film $12\mu$ in thickness was diagonally deposited with Co-V alloy (10% by weight of V) at an incident angle of 70° under the conditions of Example 1 to form a magnetic metal thin film having a columnar structure (film thickness of $0.2\mu$), thereby obtaining a magnetic tape. Myristic acid ($C_{13}H_{23}COOH$) was dissolved in isopropyl alcohol at a concentration of 0.8% by weight and coated on the film at a rate of 40 mg/m$^2$, followed by drying thus filling the lubricant in the channel. In this example, the sample filled with the lubricant was designated No. 41 and that not filled with lubricant was designated No. 42.

COMPARATIVE EXAMPLE

A polyethylene terephthalate film $12\mu$ in thickness was electrolessly plated with a cobalt magnetic thin film in a film thickness of $0.2\mu$ by the following procedures:
(1) Alkali etching
  Aqueous caustic soda solution, 5 mole/l, 80° C. for 10 min.;
(2) Washing with water;
(3) Sensitizing
  Sensitizer solution containing 10 g/l of $SnCl_2.2H_2O$ and 30 ml/l of HCl;
(4) Washing with water;
(5) Activating
  Activator solution containing 0.25 g/l of $PdCl_2$ and 10 ml/l of HCl;
(6) Washing with water;
(7) Electroless plating

| Composition of the plating solution: | |
|---|---|
| $CoCl_2.6H_2O$ | 9.5 g/l |
| $NaH_2PO_2.H_2O$ | 5.3 g/l |
| $NH_4Cl$ | 10.7 g/l |
| Citric acid | 26.5 g/l |
| Boric acid | 30.9 g/l |
| Plating conditions: | |
| pH 7.5, liquid temperature 80° C., 5 min.; | |

(8) Washing with water and drying.

Observation by SEM revealed that the magnetic thin film had no columnar structure and approximately spherical crystal grains were densely present hardly leaving any channel therebetween. The lubricants used in Examples 1-4 were coated on the thus obtained tapes, respectively, to prepare Sample Nos. 51, 52, 53 and 54. The sample applied with no lubricant was designated No. 55.

The samples obtained in the above examples and comparative example were measured in the following two tests:
  (1) Durability (degree of abrasion and peel-off) of a magnetic thin film when pressing a magnetic tape and a magnetic head at a tension of 90 g/0.5 inch and reciprocating at 38 cm/sec. 500 times; and (2) Change in dynamic coefficient of friction $\mu$ when reciprocating 0 time, 20 times, 100 times, 500 times and 2000 times, respectively under the conditions in (1) above.

The results of the measurements are shown in Table 2 below.

TABLE 2

| Sample No. | Durability when reciprocating 500 times | Change in dynamic coefficient of friction | | | | |
|---|---|---|---|---|---|---|
| | | Initial | 20 times | 100 times | 500 times | 2000 times |
| 11 | Hardly any abrasion observed | 0.32 | 0.31 | 0.32 | 0.30 | 0.33 |
| 12 | Numerous deep abrasion observed | 0.48 | 0.50 | 0.50 | 0.68 | 0.65 |
| 21 | 2-3 Shallow abrasions vaguely observed | 0.31 | 0.32 | 0.32 | 0.32 | 0.33 |
| 22 | Numerous deep abrasions | 0.49 | 0.55 | 0.52 | 0.55 | 0.67 |
| 31 | No abrasion observed | 0.33 | 0.32 | 0.33 | 0.33 | 0.33 |
| 32 | Numerous deep abrasions | 0.50 | 0.52 | 0.55 | 0.52 | 0.55 |
| 41 | 2-3 Shallow abrasions | 0.31 | 0.30 | 0.32 | 0.32 | 0.32 |
| 42 | Numerous deep abrasions | 0.48 | 0.48 | 0.58 | 0.58 | 0.60 |
| 51 | Ten and some shallow abrasions | 0.32 | 0.31 | 0.45 | 0.50 | 0.49 |
| 52 | Several deep abrasions | 0.32 | 0.31 | 0.38 | 0.48 | 0.55 |
| 53 | 2-3 Deep abrasions | 0.33 | 0.32 | 0.44 | 0.48 | 0.48 |
| 54 | Many shallow abrasions | 0.31 | 0.35 | 0.44 | 0.49 | 0.60 |
| 55 | Numerous deep abrasions | 0.45 | 0.55 | 0.54 | 0.65 | 0.64 |

As evident from the results of these measurements, the metal thin film type magnetic recording media in accordance with the present invention have remarkably improved running properties and abrasion resistance and furthermore such improving effect lasts for an extended time, thus renderend very practical as magnetic recording media.

While the invention has been described in detail and with reference to specific embodiments thereof, it will be apparent to one skilled in the art that various changes and modifications can be made therein without departing from the spirit and scope thereof.

What is claimed is:

1. A thin film magnetic recording tape, comprising: a non-magnetic support base;

a magnetic metal thin film having a thickness of about 0.1 to 0.4$\mu$, formed on a surface of said support base by vapor deposition conducted such that a vapor beam impinges said surface of said support at an angle of incidence ranging from about 50° to 85° so as to form diagonally extending channels between columnar structures in said magnetic metal thin film; and a lubricant within said channels in an amount of about 5 to 100 mg/m$^2$, said lubricant comprising fatty acids having 12 to 18 carbon atoms.

2. A thin film magnetic recording tape comprising a support having a magnetic metal thin film formed thereon by vapor deposition, said film having diagonally extending channels between columnar structures filled with an organic lubricant present in an amount of about 2 to 200 mg/m$^2$.

3. The thin film magnetic recording tape of claim 2, wherein the channels occupy about 10 to 60% of the volume of the metal layer.

4. The thin film magnetic recording tape of claim 2, wherein said layer contains at least one of iron, cobalt and nickel.

5. The thin film magnetic recording tape of claim 2, wherein said thin metal layer is about 0.05 to 2$\mu$ thick.

6. The thin film magnetic recording tape of claim 2, wherein said layer is formed by oblique incidence evaporation.

7. The thin film magnetic recording tape of claim 2, wherein said layer is formed by diagonal sputtering.

8. The thin film magnetic recording tape of claim 2, wherein said layer is formed by diagonal ion plating.

9. The thin film magnetic recording tape of claim 2, wherein said metal layer is formed by diagonal ion beam deposition.

10. The thin film magnetic recording tape of claim 2, wherein said metal layer is formed by diagonal chemical vapor deposition.

11. The thin film magnetic recording tape of claim 2, wherein said vapor deposition is conducted such that the vapor beam impinges the surface of the support at an angle of incidence ranging from about 50° to about 85° C.

* * * * *